US008845433B2

(12) United States Patent
Nelson et al.

(10) Patent No.: US 8,845,433 B2
(45) Date of Patent: Sep. 30, 2014

(54) METHODS AND DEVICES FOR GAMING MACHINE CONFIGURATION

(75) Inventors: Dwayne Nelson, Las Vegas, NV (US); Jamal Benbrahim, Reno, NV (US)

(73) Assignee: IGT, Las Vegas, NV (US)

( * ) Notice: Subject to any disclaimer, the term of this patent is extended or adjusted under 35 U.S.C. 154(b) by 1785 days.

(21) Appl. No.: 11/154,048

(22) Filed: Jun. 15, 2005

(65) Prior Publication Data

US 2005/0227771 A1 Oct. 13, 2005

Related U.S. Application Data

(63) Continuation-in-part of application No. 10/481,050, filed on Dec. 16, 2003, now Pat. No. 8,622,800.

(51) Int. Cl.
*A63F 13/00* (2014.01)
*G07F 17/32* (2006.01)

(52) U.S. Cl.
CPC ............ *G07F 17/3267* (2013.01); *G07F 17/32* (2013.01)
USPC ................... 463/42; 463/16; 463/25; 463/29; 463/43

(58) Field of Classification Search
USPC ........... 463/16, 20, 23, 24, 40–42, 18, 25, 29; 717/168–173
See application file for complete search history.

(56) References Cited

U.S. PATENT DOCUMENTS 5,664,998 A 9/1997 Seelig et al. .................... 463/20

(Continued)

FOREIGN PATENT DOCUMENTS

| | | |
|---|---|---|
| AU | 755826 | 2/1999 |
| AU | 2006202494 | 1/2012 |
| GB | 2106685 | 4/1983 |
| WO | 03/083789 | 10/2003 |

OTHER PUBLICATIONS

USPTO Office Action mailed Nov. 2, 2006 in prior U.S. Appl. No. 10/481,050 (13 pages).
USPTO Final Office Action mailed Jul. 13, 2007 in prior U.S. Appl. No. 10/481,050 (12 pages).

(Continued)

*Primary Examiner* — Ronald Laneau
*Assistant Examiner* — Ross Williams
(74) *Attorney, Agent, or Firm* — Foley & Lardner LLP

(57) ABSTRACT

The present invention provides novel method and devices for configuring gaming machines. Some preferred implementations of the invention provide a portable computing device, e.g., a personal digital assistant ("PDA"), that may be used to configure gaming machines. Some such portable computing devices include software and hardware for displaying graphical user interfaces with which an operator can interact to indicate a desired gaming machine configuration. Some preferred embodiments provide a standardized format for menus and/or GUIs that can be used to configure various types of gaming machines. The portable computing device may have one or more convenient interfaces, such as a uniform serial bus ("USB") interface, an infrared interface, etc., configured for communication with a gaming machine. For example, the interface can allow desired gaming machine configuration parameters to be transmitted to the gaming machine and actual gaming machine configuration parameters to be received from the gaming machine. In some implementations, the portable computing device may be used to verify the configurations of gaming machines that have been previously configured using other methods and/or devices (e.g., via a gaming network).

28 Claims, 9 Drawing Sheets

(56) References Cited

U.S. PATENT DOCUMENTS

| | | | | |
|---|---|---|---|---|
| 5,830,069 | A | 11/1998 | Soltesz et al. | |
| 6,110,043 | A | 8/2000 | Olsen | 463/27 |
| 6,210,275 | B1 | 4/2001 | Olsen | 463/16 |
| 6,224,484 | B1 | 5/2001 | Okuda et al. | 463/27 |
| 6,231,445 | B1 | 5/2001 | Acres | 463/42 |
| 6,293,866 | B1 * | 9/2001 | Walker et al. | 463/20 |
| 6,368,216 | B1 | 4/2002 | Hedrick et al. | |
| 6,488,585 | B1 * | 12/2002 | Wells et al. | 463/43 |
| 6,506,118 | B1 | 1/2003 | Baerlocher et al. | 463/25 |
| 6,533,273 | B2 | 3/2003 | Cole et al. | 273/138.1 |
| 6,565,436 | B1 | 5/2003 | Baerlocher | 463/26 |
| 6,620,046 | B2 | 9/2003 | Rowe | 463/25 |
| 6,645,073 | B2 | 11/2003 | Lemay et al. | 463/20 |
| 6,732,195 | B1 * | 5/2004 | Baldwin | 710/6 |
| 6,837,793 | B2 | 1/2005 | McClintic | |
| 2001/0054794 | A1 | 12/2001 | Cole et al. | 273/138.1 |
| 2002/0119818 | A1 | 8/2002 | Savio et al. | |
| 2003/0014179 | A1 * | 1/2003 | Szukala et al. | 701/114 |
| 2003/0119573 | A1 | 6/2003 | McClintic | |
| 2003/0216182 | A1 | 11/2003 | Gauselmann | |
| 2005/0026669 | A1 | 2/2005 | Nelson et al. | |
| 2005/0197191 | A1 * | 9/2005 | McKinley et al. | 463/43 |
| 2005/0261062 | A1 * | 11/2005 | Lewin et al. | 463/42 |
| 2006/0026304 | A1 * | 2/2006 | Price | 710/8 |

OTHER PUBLICATIONS

USPTO Office Action mailed Jul. 21, 2008 in U.S. Appl. No. 10/481,050 (11 pages).

US Final Office Action mailed Dec. 23, 2008 issued in U.S. Appl. No. 10/481,050 (8 pages).

US Advisory Action mailed Mar. 11, 2009 issued in U.S. Appl. No. 10/481,050 (3 pages).

US Office Action mailed Jul. 9, 2009, issued in U.S. Appl. No. 10/481,050 (7 pages).

US Final Office Action mailed Mar. 18, 2010 issued in U.S. Appl. No. 10/481,050 (8 pages).

US Office Action mailed Jun. 22, 2010 issued in U.S. Appl. No. 10/481,050 (8 pages).

US Office Action mailed Feb. 3, 2011 issued in U.S. Appl. No. 10/481,050 (8 pages).

Australian Office Action mailed Mar. 18, 2011, Application No. 2006202494.

Australian Office Action mailed Feb. 23, 2010 Application No. 2006202494.

Australian Office Action mailed Jul. 8, 2011, Application No. 2006202494.

U.S. Office Action mailed Mar. 2, 2012 issued in U.S. Appl. No. 10/481,050.

* cited by examiner

METHODS AND DEVICES FOR GAMING MACHINE CONFIGURATION

CROSS-REFERENCE TO RELATED APPLICATIONS

This application is a continuation-in-part of U.S. patent application Ser. No. 10/481,050, filed Dec. 16, 2003 now U.S. Pat. No. 8,622,800 and entitled "System and Method of Providing an Instant Bonus for a Gaming Apparatus," which is hereby incorporated by reference in its entirety.

FIELD OF THE INVENTION

The present invention relates to gaming machines, such as slot machines and video poker machines. More particularly, the present invention relates to methods and devices for configuring gaming machines.

BACKGROUND OF THE INVENTION

Typically, utilizing a master gaming controller, a gaming machine controls various combinations of devices that allow a player to play a game on the gaming machine and also encourage game play on the gaming machine. For example, a game played on a gaming machine usually requires a player to input money or an indicia of credit into the gaming machine, indicate a wager amount, and initiate game play. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines a game outcome, presents the game outcome to the player and may dispense an award of some type depending on the outcome of the game.

Different gaming machines have different capabilities and need to be configured differently. For example, Class II gaming machines have different capabilities from those of Class III gaming machines. For example, the latter will generally have a device for independently and randomly determining a game outcome, e.g., by using a random number generator. By contrast, Class II gaming machines display game outcomes that are determined, e.g., by a central game server.

Moreover, gaming machines with similar capabilities can be configured to provide different functions. For example, Class III gaming machines and some types of Class II gaming machines (or similar devices such as video lottery terminals) may be configured to operate as "stand-alone" devices or as networked devices. Some gaming machines may be configured to dispense payouts in cash and others may issue a ticket to be redeemed for cash. Traditionally, gaming machines have been configured to play a particular type of game, but some novel gaming machines developed by IGT can be configured to allow the same gaming machine to play various types of games.

The process of configuring gaming machines and/or of verifying the configuration of gaming machines can be tedious and time-consuming. An operator is typically required to configure an older gaming machine (e.g., one of IGT's S-2000 gaming machines) by unlocking the gaming machine with a special key and then responding to a sequence of prompts by pressing buttons. Many such devices lack a full-sized display screen and have only a small display for displaying the sequence of prompts. Some such displays are so small that code must be used for each configuration parameter. An operator must know these codes or must refer to a reference, such as a code book, to interpret the codes. If an operator responds to one prompt incorrectly, the operator may need to go through the whole sequence again to configure the machine properly. Retrofitting older machines with a larger display screen could alleviate some of these problems, but this solution would be costly.

Newer video gaming machines have full-sized display screens, some of which have touch-screen capability. These gaming machines typically have more convenient menus for configuration than do older gaming machines. However, these menus are not standardized. This lack of standardization slows the process of configuring such machines and is believed to be a source of operator error. Moreover, an operator needs to interrupt game play on such a gaming machine in order to view the menus and configure the machine. Such interruptions cause inconvenience to the player and may reveal information to the player that the gaming establishment wishes to remain confidential.

For the foregoing reasons and other reasons, it would be desirable to provide novel methods and devices for configuring gaming machines that address these and other limitations of the prior art.

SUMMARY OF THE INVENTION

The present invention provides novel method and devices for configuring gaming machines. Some preferred implementations of the invention provide a portable computing device, e.g., a personal digital assistant ("PDA"), that may be used to configure gaming machines without interrupting game play. Some such portable computing devices include software and hardware for displaying menus, e.g., in the form of graphical user interfaces ("GUIs"), with which an operator can interact to indicate a desired gaming machine configuration. (Although a menu need not be a GUI and a GUI need not be a menu, these terms may be used interchangeably herein to avoid repetition.) Some preferred embodiments provide a standardized format for menus that can be used to configure various types of gaming machines. Other implementations allow an operator to receive a menu from a gaming machine that is particular to that type of gaming machine. Some embodiments allow an operator to establish configuration data for one or more types of gaming machines, select configuration data appropriate for a type of gaming machine and transmit the appropriate configuration data to the gaming machine.

The portable computing device may have one or more convenient interfaces configured for communication with a gaming machine. For example, the interface can allow desired gaming machine configuration parameters to be transmitted to the gaming machine and actual gaming machine configuration parameters to be received from the gaming machine. In some implementations, the portable computing device may be used to verify the configurations of gaming machines that have been previously configured using other methods and/or devices (e.g., via a gaming network).

Some implementations of the invention provide a method for configuring a gaming machine. The method includes these steps: establishing communication between a portable computing device and a gaming machine; determining whether the portable computing device has a stored configuration menu for configuring the gaming machine; displaying a configuration menu on the portable computing device; indicating desired configuration data according to the configuration menu; and transmitting the desired configuration data to the gaming machine. The gaming machine may be configured according to the desired configuration data.

If the portable computing device has a stored configuration menu, it can be retrieved from a memory of the portable computing device. If the portable computing device does not have a stored configuration menu, it can be obtained from the gaming machine or from another networked device, such as a server, a storage device or a host device.

Other implementations of the invention provide alternative methods for configuring a gaming machine. One such method includes these steps: establishing communication between a portable computing device and a gaming machine; determining whether the portable computing device has stored configuration data for configuring the gaming machine; and obtaining a configuration menu when the portable computing device does not have stored configuration data for configuring the gaming machine.

The obtaining step comprises obtaining the configuration menu from the gaming machine or from another device (such as a server, a host device or a storage device) via a network. The method can also include these steps: displaying the configuration menu on the portable computing device; indicating desired configuration data according to the configuration menu; and transmitting the desired configuration data to the gaming machine.

Another method of the invention includes these steps: establishing communication between a portable computing device and a gaming machine; receiving configuration data from the gaming machine; and determining, based on the received configuration data, whether a configuration of the gaming machine needs to be changed. The method can include the steps of indicating desired configuration data when it is determined that the configuration of the gaming machine needs to be changed and transmitting the desired configuration data to the gaming machine.

The determining step can involve displaying the configuration data on the portable computing device and determining, based on the displayed configuration data, whether the configuration of the gaming machine needs to be changed. Alternatively, the determining step can involve making a comparison between the received configuration data and desired configuration data stored on the portable computing device and determining, based on the comparison, whether the configuration of the gaming machine needs to be changed.

Some embodiments of the invention provide a portable computing device, comprising: at least one logic device configured to control elements of the portable computing device; an interface configured for communication with a gaming machine; and a display configured to allow a user of the portable computing device to indicate desired configuration parameters and to allow the user to cause the desired configuration parameters to be transmitted to the gaming machine via the interface.

The interface can be a wired or a wireless interface. The interface can be configured to receive actual gaming machine configuration parameters from the gaming machine.

The display can be, for example, a touch screen display. Gaming machine configuration parameters may be displayed via at least one graphical user interface. The display may be further configured to display actual gaming machine configuration parameters. Gaming machine configuration parameters can be displayed according to menu data received from the gaming machine via the interface. The gaming machine configuration parameters may be displayed in a consistent fashion regardless of gaming machine type. In some implementations, gaming machine configuration parameters are displayed according to gaming machine type.

A logic device may determine desired gaming machine configuration parameters according to gaming machine identification information. The gaming machine identification information may be received from the gaming machine via the interface or from a user.

All of the foregoing methods, along with other methods of the present invention, may be implemented by software, firmware and/or hardware. For example, the methods of the present invention may be implemented by computer programs embodied in machine-readable media.

These and other features of the present invention will be presented in more detail in the following detailed description of the invention and the associated figures.

BRIEF DESCRIPTION OF THE DRAWINGS

The invention may best be understood by reference to the following description taken in conjunction with the accompanying drawings, which are illustrative of specific implementations of the present invention.

DESCRIPTION OF THE PREFERRED EMBODIMENTS

Figure 1:
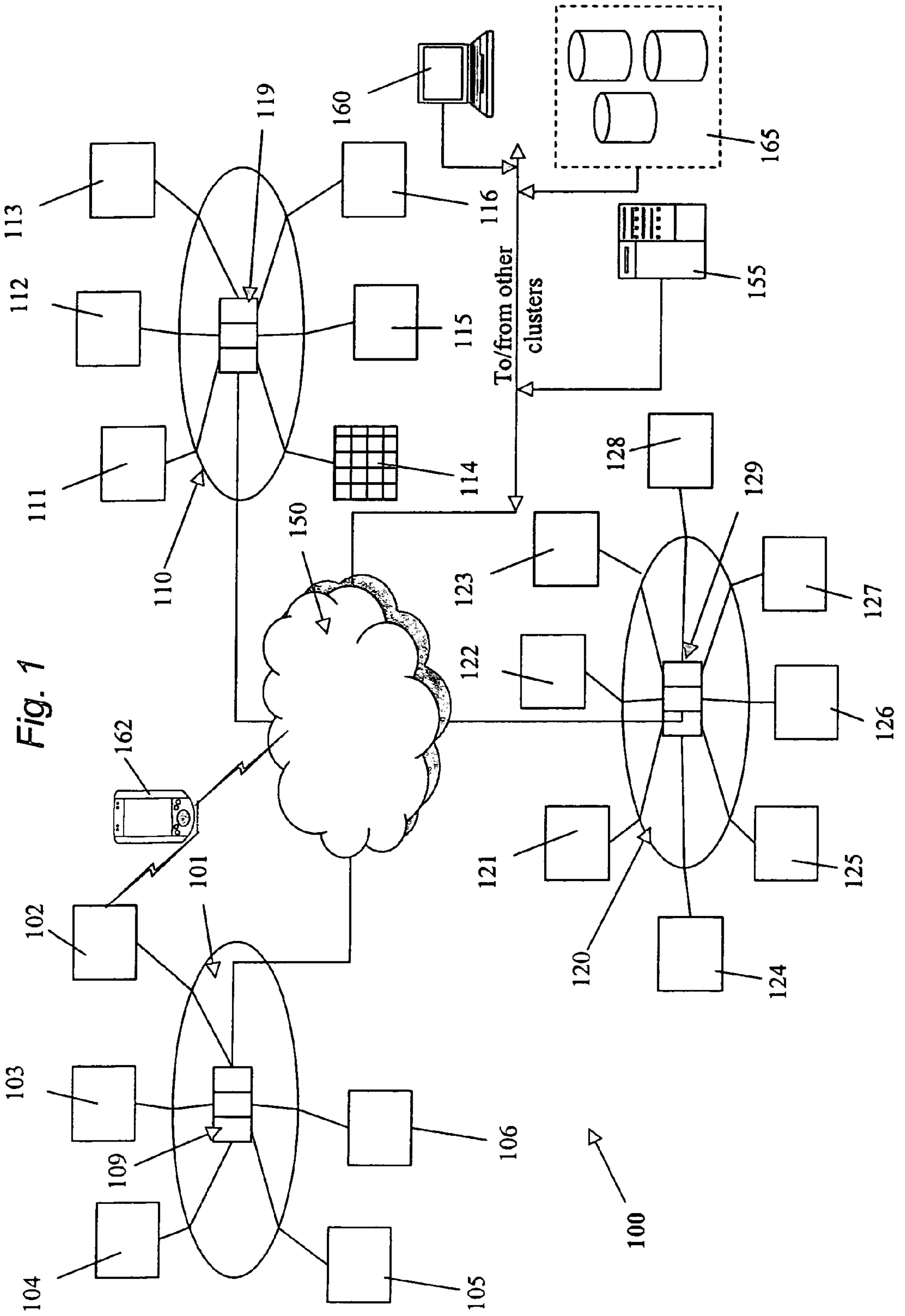
FIG. 1 is a block diagram depicting a portion of a network of gaming machines.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention provides novel method and devices for configuring gaming machines and similar devices. Although the current description primarily describes method and devices for configuring gaming machines, some implementations of the invention apply equally to configuring similar types of machines, such as video lottery terminals and other devices that are used primarily to display a game outcome.

Some preferred implementations of the invention provide a portable computing device, e.g., a PDA, a laptop computer, etc., that may be used to configure gaming machines. The portable computing device preferably includes software and hardware for rendering displays with which an operator can interact to indicate a desired gaming machine configuration and perform other tasks without interrupting game play. The displays may be in the form of menus and/or GUIs. In some preferred embodiments, the portable computing device includes touch screen capability, such that the operator may interact with displayed GUIs to establish, transmit and/or verify desired a gaming machine configuration.

The portable computing device may have one or more convenient interfaces, such as a uniform serial bus ("USB") interface, a wired or wireless Ethernet interface, a Blue Tooth™ interface, an infrared interface, etc., for communicating with gaming machines and/or other devices. For example, the portable computing device should be configured for transmitting a desired gaming machine configuration to a gaming machine via such an interface and for receiving configuration data, menus/GUIs, etc., from the gaming machine. Some legacy gaming machines may need to be retrofitted with corresponding interfaces to permit communication with the portable computing device.

Preferably, the portable computing device may be used to verify the configuration of a gaming machine. For example, the portable computing device may receive configuration data from a gaming machine and compare these configuration data with desired configuration data to determine whether the gaming machine is properly configured. The portable computing device may verify the configuration of a gaming machine that has been individually configured by the portable computing device.

Alternatively, the portable computing device may verify the configuration of a gaming machine that has previously been configured using other methods and/or devices. For example, one or more gaming machines may be configured via a gaming network and the portable computing device may verify the configuration of one or more of these gaming machines. In some implementations, multiple gaming machines are configured via a gaming network and the portable computing device is used to "spot check" the configuration of some of these gaming machines.

FIG. 1 is a simplified schematic depiction of one portion of a gaming establishment that can implement some methods of the present invention. Gaming establishment 100 includes banks, also referred to as "clusters," 101, 110 and 120, having assigned switches 109, 119 and 129, respectively. Bank 101 includes gaming machines 102 through 106 in communication with switch 109. Similarly, bank 110 includes gaming machines 111 through 116 in communication with switch 119 and bank 120 includes gaming machines 121 through 128 in communication with switch 129.

Switches 109, 119, 129 and other switches in the gaming establishment are interconnected via network 150. Gaming machines and other networked devices in other gaming establishments may also be interconnected via network 150.

Here, server 155, host device 160 (which is a laptop computer in this example) and storage devices 165 are also connected to network 150. PDA 162 is configured for wireless connection with network 150 and with at least some of the gaming machines in the gaming network, such as gaming machine 102. The gaming network includes other devices not depicted in FIG. 1A, some of which will be described below with reference to FIG. 4.

Figure 2A:
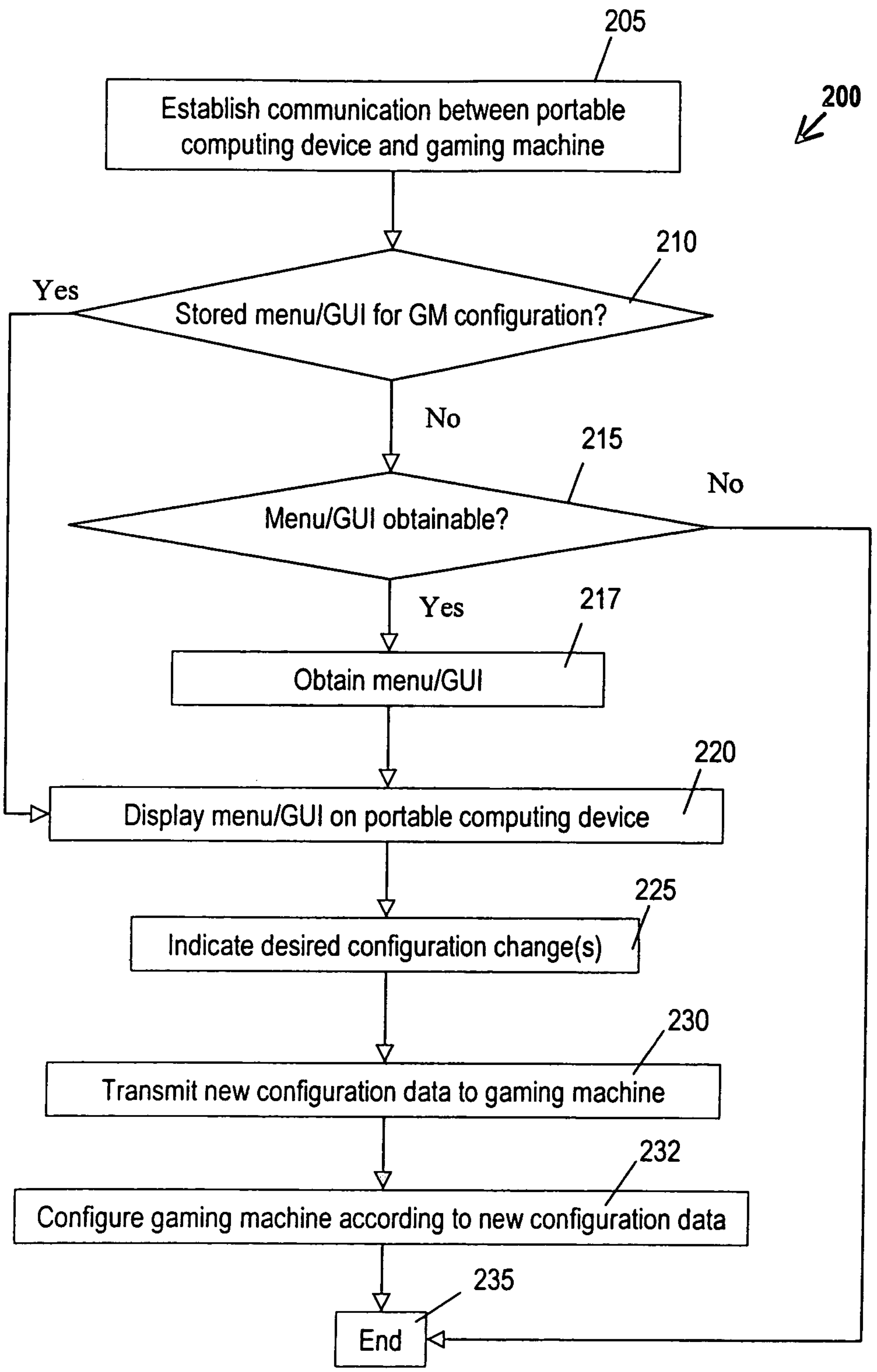
FIG. 2A is a flow chart that outlines some methods of the present invention.

Some implementations of the present invention will now be described with reference to FIG. 2A. Those of skill in the art will appreciate that the steps of method 200 and other methods described herein need not be performed (and in some implementations are not performed) in the order indicated. Moreover, some implementations of these methods may include more or fewer steps than those illustrated and/or described herein.

In step 205 of method 200, communication is established between a portable computing device and a gaming machine according to methods known by those of skill in the art. In one such example, the portable computing device sends a wireless request to initiate a communication to an interface of the gaming machine, the gaming machine sends a challenge to the portable computing device and the portable computing device replies to the gaming machine with an acceptable response. Various protocols can be used for communication between the portable computing device and the gaming machine, including but not limited to IGT's SuperSAS™ protocol over Ethernet.

In step 210, it is determined (e.g., by the portable computing device) whether there is a stored menu and/or GUI suitable for configuring this type of gaming machine. For example, the gaming machine may transmit identification data to the portable computing device. The portable computing device may determine, according to the identification data, whether the portable computing device has a menu available that is suitable for configuring the gaming machine. The portable computing device may, for example, receive and store updated menus (e.g., from a network device of the gaming establishment such as server 155) as such menus become available. Some such menus may be standardized menus, in the sense that they are useable for a range of different gaming machine types. Other menus may be specific to a particular type of gaming machine.

If the portable computing device does not have an appropriate menu, the portable computing device will determine whether it can obtain such a menu. (Step 215.) For example, the portable computing device may attempt to obtain a menu from the gaming machine. According to one such implementation, browser software installed on the portable computing device is used to browse information, including configuration menus/GUIs and other data, stored on the gaming machine. For example, some such data may be stored as hypertext markup language ("HTML") pages on the gaming machine, which are browsed by the browser. In some implementations of the invention, the step of obtaining a menu may involve causing the gaming machine (or system host) send drawing commands to the portable computing device. In this manner, a menu could be displayed by a display of the portable computing device in response to such drawing commands.

Alternatively, the portable computing device may attempt to obtain an appropriate menu from another device, e.g., by downloading an appropriate configuration menu from a network device of the gaming establishment or elsewhere in a gaming network, from a network device external to a gaming network (e.g., via the Internet), etc. The portable computing device will obtain the menu if one is available. (Step 217.) For example, the portable computing device may obtain one or more HTML pages and use one or more of the HTML pages as a configuration menu.

If the portable computing device cannot obtain an appropriate menu, the process ends. (Step 235.) The gaming machine will need to be configured according to another method.

However if the portable computing device obtains an appropriate menu, the menu is displayed on the portable computing device. (Step 220.) An example of one such configuration menu will be described below with reference to FIG. 3B. An operator may indicate a desired configuration according to the menu (step 225), e.g., by updating selected configuration parameters indicated on the menu according to desired configuration parameters. The operator may then cause the desired configuration parameters to be transmitted to the gaming machine. (Step 230.) The gaming machine will be configured according to the received configuration data. (Step 232.)

Figure 2B:
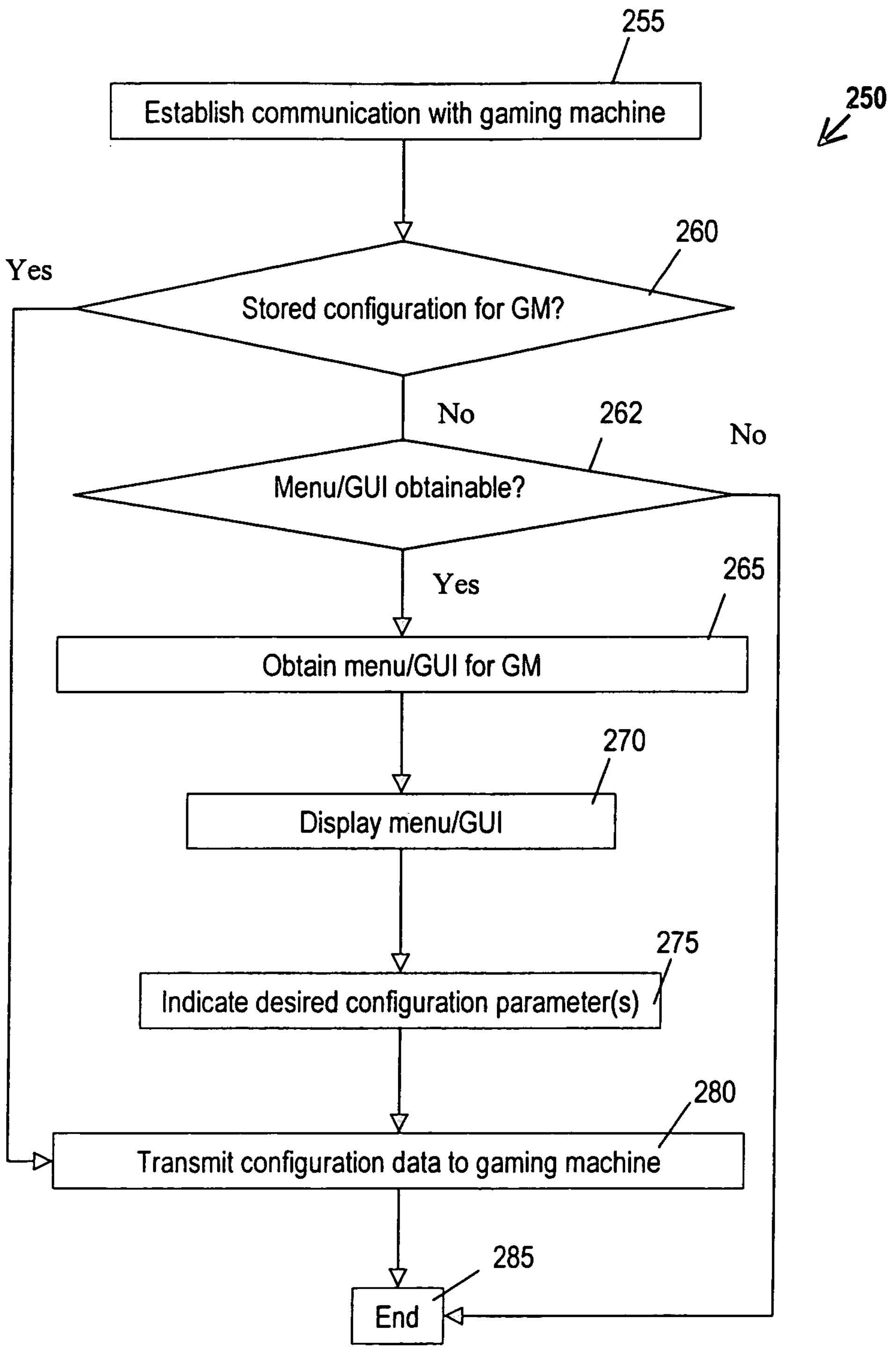
FIG. 2B is a flow chart that outlines alternative methods of the present invention.

FIG. 2B is a flowchart that outlines alternative method 250 according to the present invention. According to method 250, desired configuration parameters may be determined in advance for one or more types of gaming machines. If a gaming machine to be configured is one of these types of gaming machines, an operator may simply establish communication with the gaming machine (step 255) and transmit the desired configuration parameters to the gaming machine (step 280). The communication may be established (and accordingly the gaming machine configuration may be performed) via a direct connection, e.g., between portable computing device 162 and gaming machine 102 of FIG. 1, or via a network, e.g., between host device 160 and gaming machine 124 of FIG. 1.

When the connection is made via a network, a plurality of gaming machines may be configured in a single operation. For example, if gaming machines 121, 125 and 128 are all the same type, the desired configuration parameters may be selected and transmitted to all of these gaming machines in response to a single command from, e.g. host device 160. For example, the desired configuration parameters may be stored in a memory accessible by host device 160 (e.g., a local memory or memory of one or more storage devices 165) and transmitted via network 150 to switch 129, which transmits the desired configuration parameters to gaming machines 121, 125 and 128.

According to this example, if it is determined in step 260 that desired configuration parameters have not been determined in advance for the type of gaming machine with which a communication has been established, it is determined in step 262 whether a menu/GUI is obtainable from another source, e.g., as in step 215 of method 200. These determinations may be made, for example, by a logic device of a portable computing device, of a networked host device, etc. If no such menu is obtainable, the process ends (step 285) and the gaming machine will need to be configured according to other methods.

However, if a menu can be obtained (step 265), it is displayed (step 270), e.g. on a display of a portable computing device. Desired configuration parameters are indicated in step 275 and these parameters are then transmitted to the gaming machine.

According to some implementations of the invention, a portable computing device may be used to "spot check" or verify gaming machine configurations that have previously been performed. For example, a plurality of gaming machines may be configured via a network, as described above or otherwise, and then portable computing device may be used verify the configuration of some or all of these gaming machines.

Figure 3A:
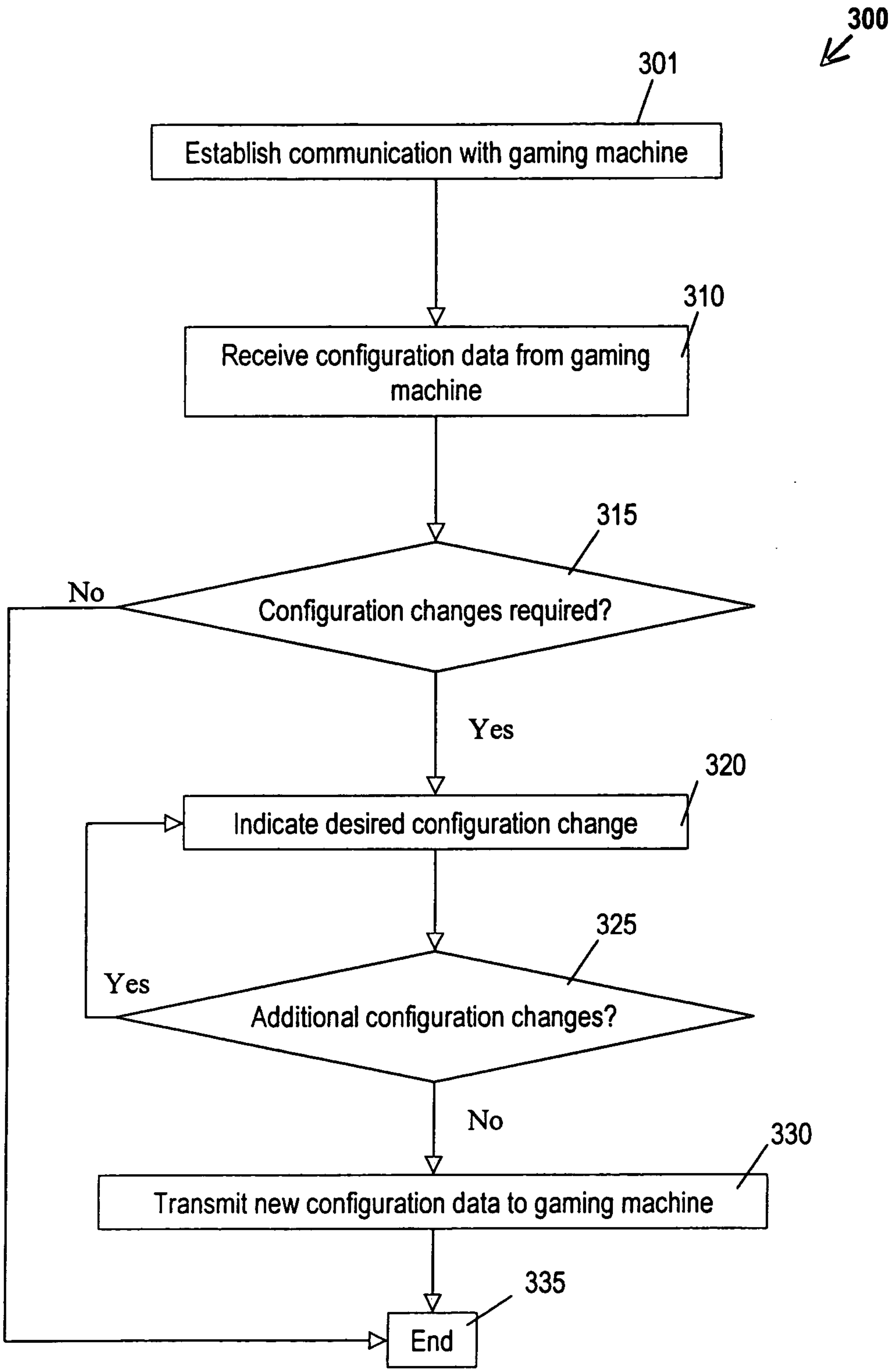
FIG. 3A is a flow chart that provides an overview of other methods of the present invention.

FIG. 3A is a flowchart that illustrates one such method. After communication has been established between a portable computing device and a gaming machine (step 301), configuration data are received from the gaming machine (step 310). In step 315, it is determined whether configuration changes are required. In some implementations of method 300, step 315 is performed by displaying configuration data received from the gaming machine on a display device of the portable computing device and allowing an operator to evaluate the configuration data and thereby determine whether configuration changes are required.

However, in some implementations of method 300, a logic device of the portable computing device determines whether configuration changes are required, e.g., by comparing the configuration data received from the gaming machine with desired configuration data for the gaming machine. In some such implementations, both the operator and the portable computing device may determine whether configuration changes are required, e.g., as set forth below. The desired configuration data may be stored on the portable computing device or in a memory that the portable computing device can access, e.g., via a gaming network or another network.

In step 320, the desired configuration changes are indicated. For example, if a logic device of the portable computing device determines that configuration changes are required, the logic device may cause the desired configuration changes to be indicated on a display of the portable computing device. Alternatively, the desired configuration changes may be indicated when an operator selects a configuration parameter that needs to be changed.

If additional configuration parameter changes need to be indicated (step 325), the process returns to step 320. For example, an operator may have noticed that certain configuration parameters received from the gaming machine need to be changed and changed them. Before submitting the configuration parameters to the gaming machine, a logic device may evaluate whether additional configuration changes are required and, if so, may prompt the operator to evaluate and/or change these parameters.

If no additional configuration parameter changes need to be indicated, the new configuration data are transmitted to the gaming machine. (Step 330.) The gaming machine will configure itself according to the new configuration data. The process ends in step 335.

Figure 3B:
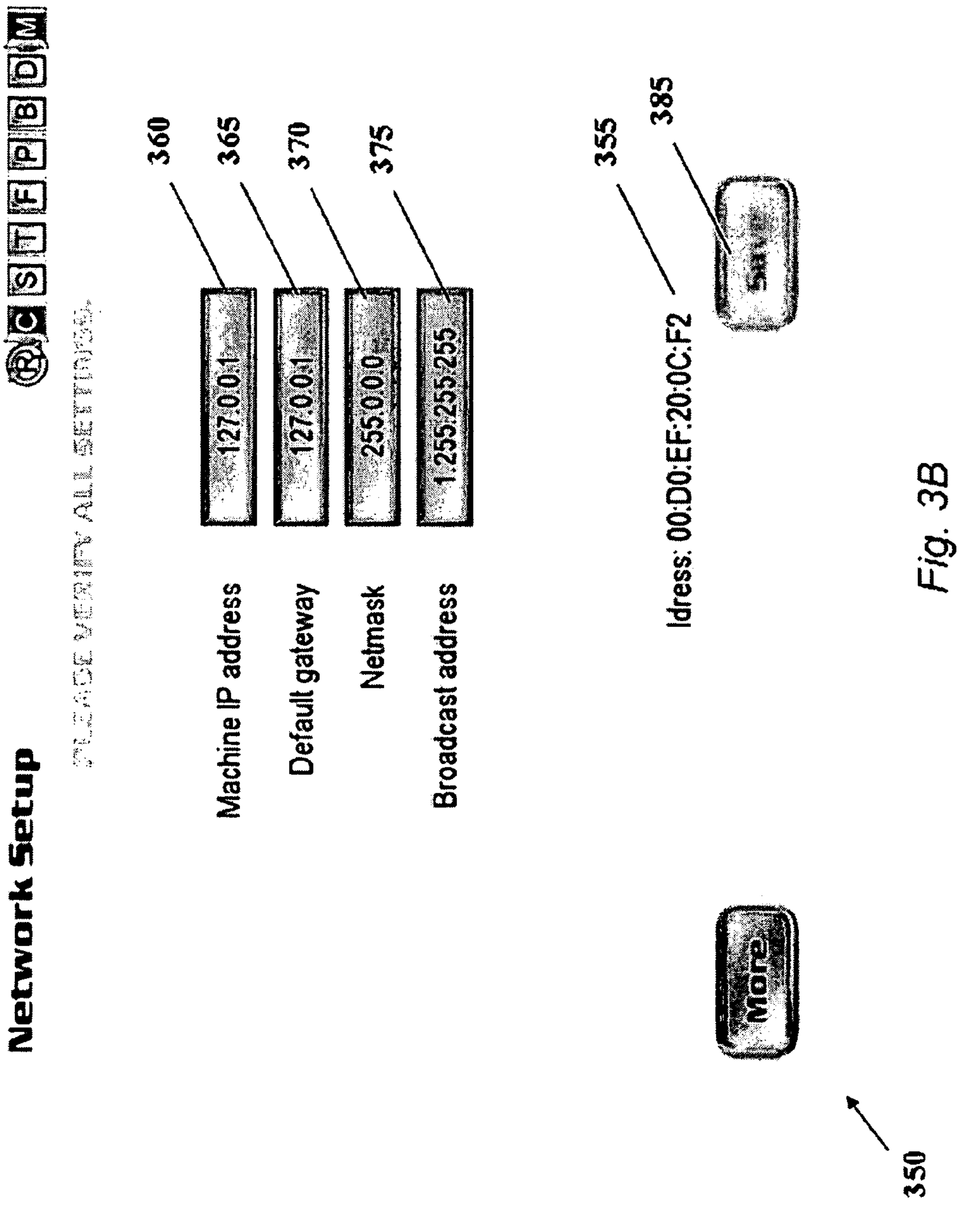
FIG. 3B provides an example of a configuration menu that can be used to implement some aspects of the invention.

FIG. 3B provides one example of a configuration menu that can be used in accordance with some aspects of the invention. For example, such a menu could be displayed on a portable computing device in step 220 of method 200 or step 270 of method 250. A menu of this type could be displayed in some implementations of method 300 at step 315. One of skill in the art will appreciate that many other formats of configuration menus are within the scope of the present invention.

Here, configuration menu 350 displays the MAC address of the gaming machine to be configured in area 355. An IP address is indicated in window 360, a default gateway is indicated in window 365, a netmask is indicated in window 370 and a broadcast address is indicated in window 375. The operator may accept the information displayed in windows 360, 365, 370 and 375 by engaging "Save" button 385. Alternatively, the operator may update selected configuration parameters indicated on the menu according to desired configuration parameters by using a user interface of the portable computing device. The operator may then cause the desired configuration parameters to be transmitted to the gaming machine. The gaming machine will be configured according to the received configuration data.

Figure 4:
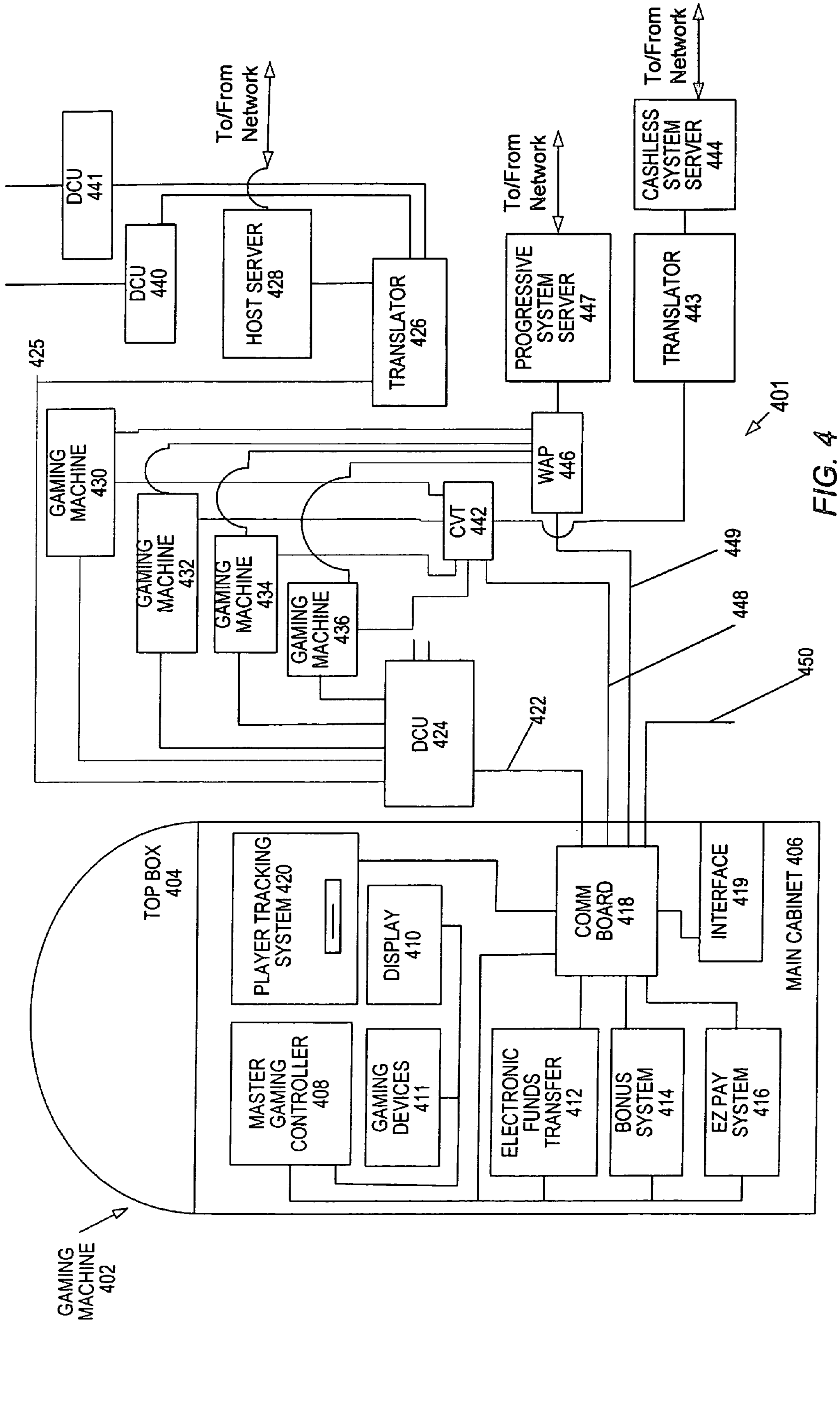
FIG. 4 is a block diagram that illustrates a gaming device and a portion of a gaming network that may be used to implement various embodiments of the present invention.

FIG. 4 is a simplified block diagram depicting, inter alia, gaming machines within gaming establishment 401. The gaming machines are connected with a dedicated communication network via a host server and a data collection unit ("DCU") according to one embodiment of the invention. According to some embodiments of the invention, the DCU is an enhanced DCU as described in U.S. patent application Ser. No. 10/187,059, entitled "Redundant Gaming Network Mediation," which is hereby incorporated by reference in its entirety.

In FIG. 4, gaming machine 402, and the other gaming machines 430, 432, 434, and 436, include a main cabinet 406 and a top box 404. The main cabinet 406 houses the main gaming elements and can also house peripheral systems, such as those that utilize dedicated gaming networks. The top box 404 may also be used to house these peripheral systems.

The master gaming controller 408 controls the game play on the gaming machine 402 and receives or sends data to various input/output devices 411 on the gaming machine 402. The master gaming controller 408 may also communicate with a display 410.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 408 may also communicate with EFT system 412, bonus system 414, EZPay™ system 416 (a proprietary cashless ticketing system of the present assignee), and player tracking system 420. The systems of the gaming machine 402 communicate the data onto the network 422 via a communication board 418.

In some implementations, the dedicated communication network is not accessible to the public. Due to the sensitive nature of much of the information on the dedicated networks, for example, electronic fund transfers and player tracking data, usually the manufacturer of a host system, such as a player tracking system, or group of host systems, employs a particular networking language having proprietary protocols. For instance, 10-20 different companies produce player tracking host systems where each host system may use different protocols. These proprietary protocols are usually considered highly confidential and not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino. Examples of protocol mediation to address these issues may be found, for example, in U.S. Pat. No. 6,682,423, "Open Architecture Communications in a Gaming Network," which is hereby incorporated by reference in its entirety.

Further, in the gaming industry, many different manufacturers make gaming machines. The communication protocols on the gaming machine are typically hard-coded into the gaming machine software, and each gaming machine manufacturer may utilize a different proprietary communication protocol. A gaming machine manufacturer may also produce host systems, in which case their gaming machines are compatible with their own host systems. However, in a heterogeneous gaming environment, such as a casino, gaming machines from many different manufacturers, each with their own communication protocol, may be connected to host systems from many different manufacturers, each with their own communication protocol. Therefore, communication compatibility issues regarding the protocols used by the gaming machines in the system and protocols used by the host systems must be considered.

In the present illustration, the gaming machines, 402, 430, 432, 434, and 436 are connected to a gaming network 422. In general, the DCU 424 functions as an intermediary between the different gaming machines on the network 422 and the host server 428. In general, the DCU 424 receives data transmitted from the gaming machines and sends the data to the host server 428 over a transmission path 426. In some instances, when the hardware interface used by the gaming machine is not compatible with the host server 428, a translator 425 may be used to convert serial data from the DCU 424 to a format accepted by the host server 428. The translator may provide this conversion service to a plurality of DCUs, such as 424, 440 and 441.

Further, in some dedicated gaming networks, the DCU 424 can receive data transmitted from the host server 428 for communication to the gaming machines on the gaming network. The received data may be communicated synchronously to the gaming machines on the gaming network. Within a gaming establishment, the gaming machines 402, 430, 432, 434 and 436 are located on the gaming floor for player access while the host server 428 is usually located in another part of gaming establishment 401 (e.g. the backroom), or at another location.

In a gaming network, gaming machines, such as 402, 430, 432, 434 and 436, may be connected through multiple communication paths to a number of gaming devices that provide gaming services. For example, communication board 418 of gaming machine 402 is connected to four communication paths, 422, 448, 449 and 450. As described above, communication path 422 allows the gaming machine 402 to send information to host server 428.

Interface 419 is configured for communication with a portable computing device of the present invention. Interface 419 may be any convenient interface, such as a USB interface, an infrared interface, etc., for receiving a gaming machine configuration from the portable computing device and for transmitting configuration data to the portable computing device.

Via communication path 448, the gaming machine 402 is connected to a clerk validation terminal 442. The clerk validation terminal 442 is connected to a translator 443 and a cashless system server 444 that are used to provide cashless gaming services to the gaming machine 402. In this implementation, other gaming machines in gaming establishment 401, including gaming machines 430, 432, 434 and 436, are also connected to clerk validation terminal 442 and also receive cashless system services. Moreover, in this implementation, cashless system server 444 is in communication with a network, which may include connectivity to gaming establishments other than gaming establishment 401. Accordingly, cashless system server 444 may provide cashless system services to gaming machines located in other gaming establishments.

Via communication path 449, the gaming machine 402 is connected to a wide area progressive (WAP) device 446. The WAP is connected to a progressive system server 447 that may be used to provide progressive gaming services to gaming machines in and, in this example, to gaming establishments other than gaming establishment 401. The progressive game services enabled by the progressive game network increase the game playing capabilities of a particular gaming machine by enabling a larger jackpot than would be possible if the gaming machine was operating in a "stand alone" mode.

Playing a game on a participating gaming machine gives a player a chance to win the progressive jackpot. The potential size of the jackpot increases as the number of gaming machines connected in the progressive network is increased. The size of the jackpot tends to increase game play on gaming machines offering a progressive jackpot.

Gaming machines 430, 432, 434 and 436 are connected to WAP device 446 and progressive system server 447. Other gaming machines may also be connected to WAP device 446 and/or progressive system server 447, as will be described below with reference to FIG. 2. Via communication path 450, the gaming machine 402 may be connected with additional gaming devices (not shown) that provide other gaming services.

In some embodiments of the present invention, gaming machines and other devices in the gaming establishment depicted in FIG. 4 are connected to a central system and/or other gaming establishments via one or more networks, which may be public or private networks. In this example, host server 428, progressive system server 447 and cashless system server are connected to an outside network. In other embodiments, a bingo server, a switch, or another type of network device may be part of an interface with an outside network. In some embodiments, a single network device links a gaming establishment with another gaming establishment and/or a central system. Such a network device will sometimes be referred to herein as a "site controller."

Figure 5:
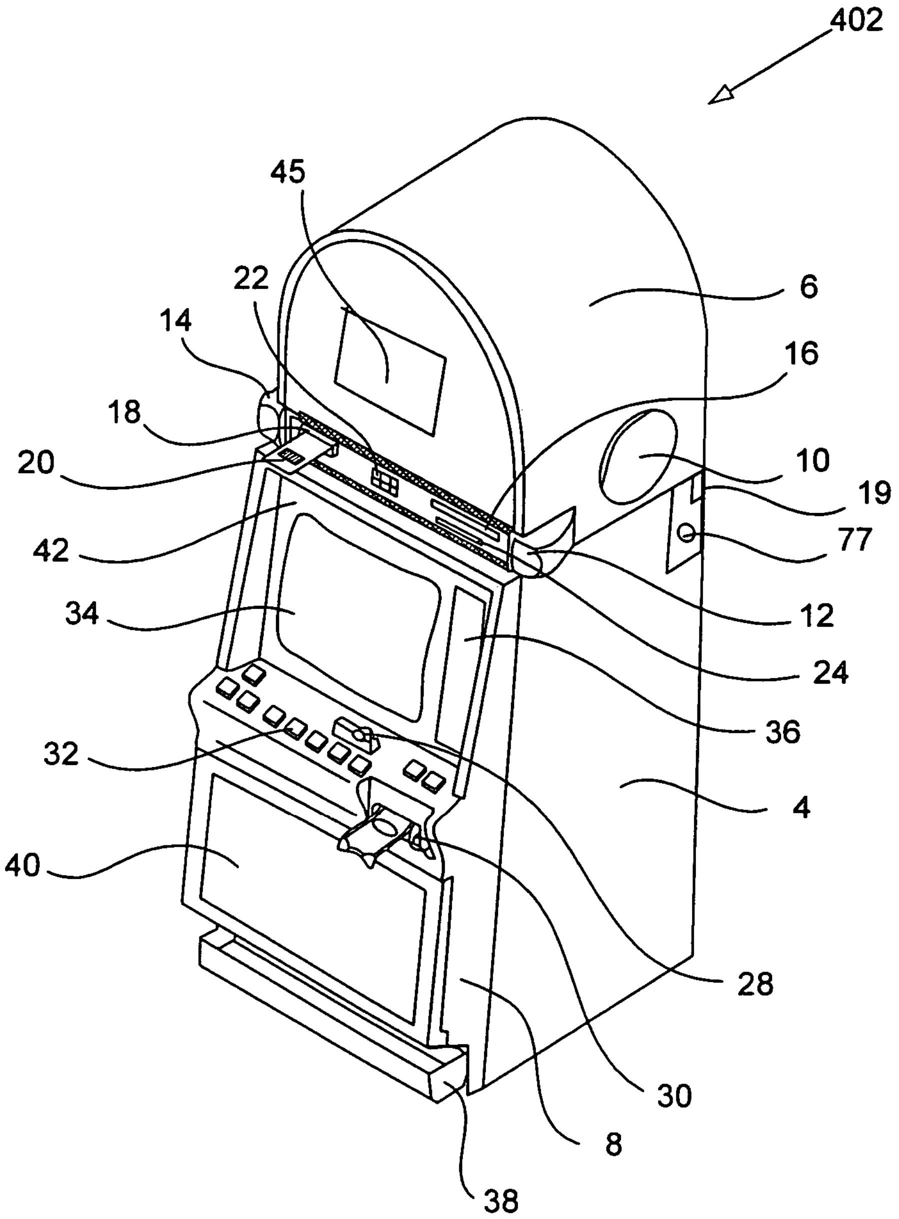
FIG. 5 illustrates a gaming device that may be used in accordance with various embodiments of the present invention.

Turning to FIG. 5, more details of gaming machine 402 are described. Machine 402 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. Some embodiments of gaming machine 402 include at least one "touch screen" display monitor. The information panel 36 may be a back-lit, silk screened glass panel with lettering to indicate general game information including, for example, the number of coins played. The bill validator 30, player-input switches 32, video display monitor 34, and information panel are devices used to play a game on the gaming machine 402. The devices are controlled by circuitry housed inside the main cabinet 4 of the machine 402.

The gaming machine 402 includes a top box 6, which sits on top of the main cabinet 4. The top box 6 houses a number of devices, which may be used to add features to a game being played on the gaming machine 402, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 to display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Gaming machine 402 includes interface 19, which is configured for communication with a portable computing device of the present invention. Interface 19 may be any convenient interface, such as a USB interface, an infrared interface, etc., for receiving a gaming machine configuration from the portable computing device and for transmitting configuration data to the portable computing device. Some legacy gaming machines that are designed for "stand-alone" use may need to be retrofitted with interface 19. Access to interface 19 may be controlled in various ways. For example, a device communicating with interface 19 may need to be authenticated. Communications between such a device and interface 19 are preferably encrypted, particularly when interface 19 is a wireless interface. In alternative implementations, access to interface 19 is controlled by requiring a special key to be inserted into opening 77.

Understand that gaming machine 402 is but one example from a wide range of gaming machine designs on which the present invention may be implemented. For example, not all suitable gaming machines have top boxes or player tracking features. Further, some gaming machines have two or more game displays—mechanical and/or video—and, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present can be deployed on most gaming machines now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, etc. In addition, to conserve serial interfaces internally in the slot machine, serial devices may be connected, e.g., in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 5, when a user wishes to play the gaming machine 402, he or she inserts cash through the coin acceptor 28 or bill validator 30. In addition, the player may use a cashless instrument of some type to register credits on the gaming machine 402. For example, the bill validator 30 may accept a printed ticket voucher, including 20, as an indicium of credit. As another example, the card reader 24 may accept a debit card or a smart card containing cash or credit information that may be used to register credits on the gaming machine.

During the course of a game, a player may be required to make a number of decisions, which affect the outcome of the game. For example, a player may vary his or her wager on a particular game, select a prize for a particular game, or make game decisions regarding gaming criteria that affect the outcome of a particular game. The player may make these choices using the player-input switches 32, the video display screen 34 or using some other device which enables a player to input information into the gaming machine.

During certain game functions and events, the gaming machine 402 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 402, from lights behind the belly glass 40 or the light panel on the player tracking unit 44.

After the player has completed a game, the player may receive award credits, game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 402. In some embodiments, these tickets may be used by a game player to obtain game services.

Figure 6:
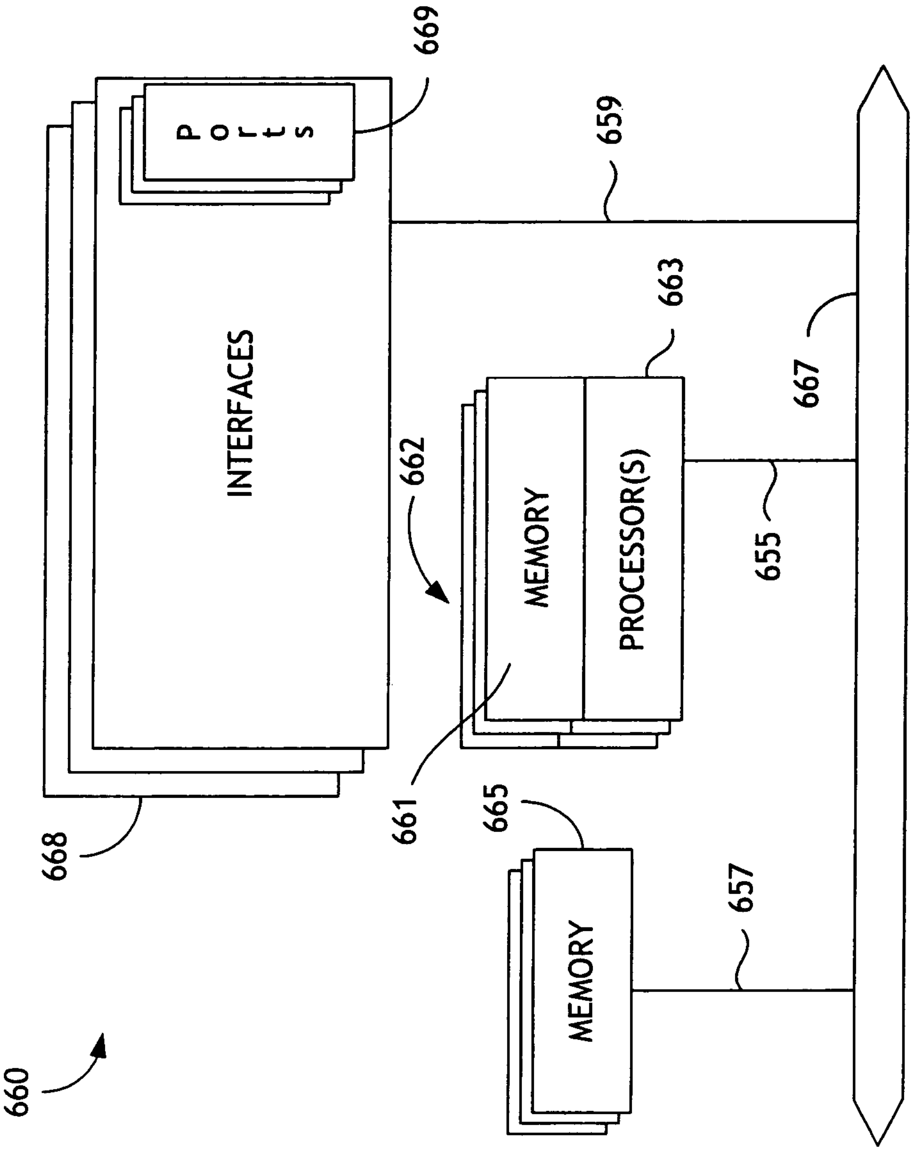
FIG. 6 is a block diagram of a network device that may be used to implement various embodiments of the present invention.

FIG. 6 illustrates an example of a network device that may be configured to implement some methods of the present invention. Network device 660 includes a master central processing unit (CPU) 662, interfaces 668, and a bus 667 (e.g., a PCI bus). Generally, interfaces 668 include ports 669 appropriate for communication with the appropriate media. In some embodiments, one or more of interfaces 668 includes at least one independent processor and, in some instances, volatile RAM. The independent processors may be, for example ASICs or any other appropriate processors. According to some such embodiments, these independent processors perform at least some of the functions of the logic described herein. In some embodiments, one or more of interfaces 668 control such communications-intensive tasks as media control and management. By providing separate processors for the communications-intensive tasks, interfaces 668 allow the master microprocessor 662 efficiently to perform other functions such as routing computations, network diagnostics, security functions, etc.

The interfaces 668 are typically provided as interface cards (sometimes referred to as "linecards"). Generally, interfaces 668 control the sending and receiving of data packets over the network and sometimes support other peripherals used with the network device 660. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 662 may be responsible for implementing specific functions associated with the functions of a desired network device. According to some embodiments, CPU 662 accomplishes all these functions under the control of software including an operating system and any appropriate applications software.

CPU 662 may include one or more processors 663 such as a processor from the Motorola family of microprocessors or the MIPS family of microprocessors. In an alternative embodiment, processor 663 is a specially designed hardware for controlling the operations of network device 660. In a specific embodiment, a memory 661 (such as non-volatile RAM and/or ROM) also forms part of CPU 662. However, there are many different ways in which memory could be coupled to the system. Memory block 661 may be used for a variety of purposes such as, for example, caching and/or storing data, programming instructions, etc.

Regardless of network device's configuration, it may employ one or more memories or memory modules (such as, for example, memory block 665) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc., for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 6 illustrates one specific network device of the present invention, it is by no means the only network device architecture on which the present invention can be implemented. For example, an architecture having a single processor that handles communications as well as routing computations, etc., is often used. Further, other types of interfaces and media could also be used with the network device. The communication path between interfaces may be bus based (as shown in FIG. 6) or switch fabric based (such as a cross-bar).

Figure 7:
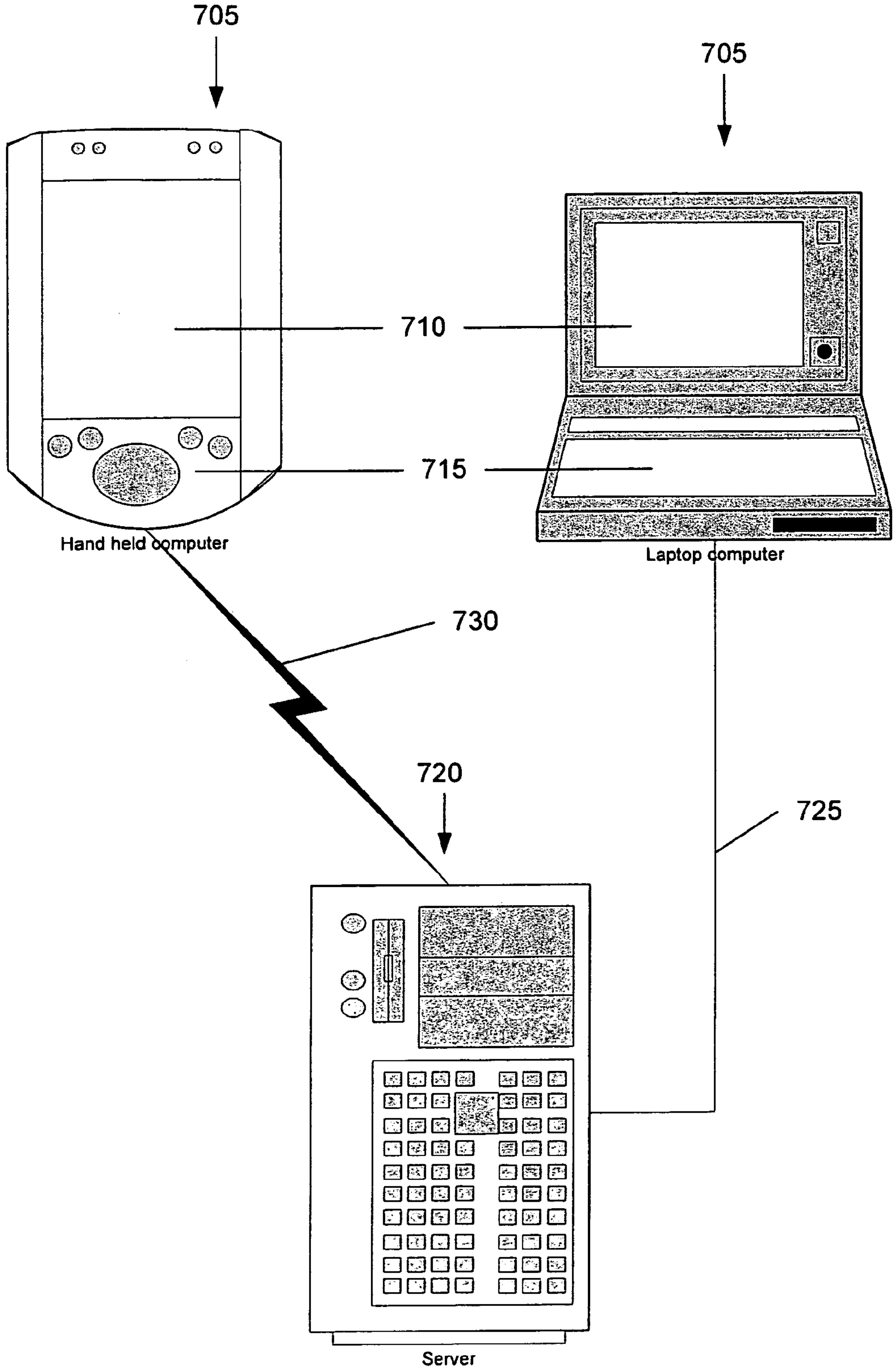
FIG. 7 illustrates some devices that may be used to implement various embodiments of the present invention.

FIG. 7 indicates some devices that may be used for gaming machine configuration and related functions, according to some implementations of the invention. Computer 705 may be any convenient type of computing device, including a desktop computer, a hand held device, a laptop computer, etc. Computer 705 includes one or more logic devices (not shown), a display 710 and an input device such as a keyboard, a mouse pad, or any other input device known in the art.

Computer 705 includes one or more interfaces (such as ports, transceivers, etc.) configured for communication with a host device 720, which is in communication with a gaming network. For example, computer 705 may communicate with host device 720 by a wired connection 725 or a wireless connection 730. In this example, host device 720 includes (or is in communication with) a wireless access point that acts as a communication hub for users of wireless embodiments of computer 705 to connect to a wired gaming network. The access point should be configured to provide heightened wireless security according to any methods known in the art.

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention. Conversely, the steps in some processes and/or components in some embodiments may be combined within the scope of the present invention. For example, some steps described herein as being performed by a central server could be performed, e.g., by a site controller or by one or more other networked devices.

While the invention has been particularly shown and described with reference to specific embodiments thereof, it will be understood by those skilled in the art that changes in the form and details of the disclosed embodiments may be made without departing from the spirit or scope of the invention. For instance, while the gaming machines of this invention have been depicted as having a top box mounted on top of the main gaming machine cabinet, the use of gaming devices in accordance with this invention is not so limited. For example, a gaming machine may be provided without a top box, or may have additional boxes or devices attached, or may be configured in bar tops, table tops, or other structures. Further, the location of the signature input devices on the gaming machine may vary widely in different embodiments. Additionally, the gaming network may be connected to other devices including other servers or gaming devices over the Internet or through other wired and wireless systems. Moreover, embodiments of the present invention may be employed with a variety of network protocols and architectures.

Thus, the examples described herein are not intended to be limiting of the present invention. It is therefore intended that the appended claims will be interpreted to include all variations, equivalents, changes and modifications that fall within the true spirit and scope of the present invention.

We claim:

1. A method for configuring a state-based gaming machine without interrupting established wager-based game play, the method comprising:

after initiating wager-based game play on the state-based gaming machine including a non-volatile memory to store a current state of wager-based game play, establishing communication between a portable computing device and the state-based gaming machine without interrupting established wager-based game play;

determining by the portable computing device, based on a type of the state-based gaming machine, that the portable computing device does not have a configuration menu for configuring the state-based gaming machine stored on the portable computing device, said configuration menu comprising a plurality of configuration parameters selectable by a user for playing a plurality of types of games on said state-based gaming machine;

obtaining by the portable computing device the configuration menu from the state-based gaming machine;

displaying the configuration menu on the portable computing device;

indicating by the user desired configuration data according to the configuration menu; and transmitting by the portable computing device the desired configuration data to the state-based gaming machine to configure the state-based gaming machine in accordance with the desired configuration data without interrupting established wager-based game play.

2. The method of claim 1, wherein the step of obtaining the configuration menu further comprises downloading the configuration menu from a network device.

3. The method of claim 1, further comprising the step of configuring the gaming machine according to the desired configuration data.

4. A method for configuring a state-based gaming machine without interrupting established wager-based game play, the method comprising:

after initiating wager-based game play on the stated-based gaming machine, establishing communication between a portable computing device and the stated-based gaming machine without interrupting established game play;

determining by the portable computing device that the portable computing device does not have configuration data stored thereon for configuring the state-based gaming machine;

obtaining by the portable computing device a configuration menu from the state-based gaming machine, said configuration menu comprising a plurality of configuration parameters selectable by a user for playing a plurality of types of games on said gaming machine; and transmitting by the portable computing device one or more configuration parameters to the state-based gaming machine to change a configuration of the state-based gaming machine without interrupting established wager-based game play.

5. The method of claim 4, the method further comprising:

indicating desired configuration parameters according to the configuration menu.

6. A method for verifying a configuration of a state-based wager gaming machine without interrupting established wager-based game play, the method comprising:

after initiating wager-based game play on the state-based gaming machine, establishing communication between a portable computing device and the gaming machine without interrupting established wager-based game play;

receiving by the portable computing device configuration data from the state-based gaming machine;

determining by the portable computing device that the portable computing device does not have a configuration menu stored thereon for configuring the state-based gaming machine, said configuration menu comprising a plurality of configuration parameters selectable by a user for playing a plurality of types of games on said gaming machine;

obtaining the configuration menu from the state-based gaming machine for use in determining desired configuration data;

displaying the configuration menu on the portable computing device;

determining by the portable computing device that a configuration of the state-based gaming machine needs to be changed based on a comparison between the received configuration data and the desired configuration data; and configuring, by the portable computing device, the state-based wager gaming machine according to the desired configuration data without interrupting established game play.

7. The method of claim 6, further comprising:

transmitting the desired configuration data to the gaming machine.

8. A portable computing device, comprising:

at least one logic device configured to control elements of the portable computing device;

an interface configured for communication with a gaming machine, wherein the interface is further configured to establish communication between the portable computing device and the gaming machine without interrupting established game play after game play on the gaming machine has been initiated;

a display configured to allow a user of the portable computing device to indicate desired configuration parameters on a configuration menu and to allow the user to cause the desired configuration parameters to be transmitted to the gaming machine via the interface without interrupting established game play, said configuration menu comprising a plurality of configuration parameters selectable by the user for playing a plurality of types of games on said gaming machine; and the at least one logic device further configured to:

determine that the portable computing device does not have a configuration menu stored thereon for configuring the gaming machine, obtain the configuration menu from the gaming machine via the interface, and cause the display to display the configuration menu.

9. The portable computing device of claim 8, wherein the interface is a wireless interface.

10. The portable computing device of claim 8, wherein the display is a touch screen display.

11. The portable computing device of claim 8, wherein gaming machine configuration parameters are displayed via at least one graphical user interface.

12. The portable computing device of claim 8, wherein the interface is configured to receive actual gaming machine configuration parameters from the gaming machine.

13. The portable computing device of claim 8, wherein the at least one logic device determines desired gaming machine configuration parameters according to gaming machine identification information.

14. The portable computing device of claim 13, wherein the gaming machine identification information is received from the gaming machine via the interface.

15. The portable computing device of claim 13, wherein the gaming machine identification information is received from a user.

16. The portable computing device of claim 8, wherein the display is further configured to display actual gaming machine configuration parameters.

17. The portable computing device of claim 16, wherein gaming machine configuration parameters are displayed according to menu data received from the gaming machine via the interface.

18. The portable computing device of claim 8, wherein gaming machine configuration parameters are displayed in a consistent fashion regardless of gaming machine type.

19. The portable computing device of claim 8, wherein gaming machine configuration parameters are displayed according to gaming machine type.

20. A portable computing device, comprising:

an interface configured to establish communication between the portable computing device and a gaming machine without interrupting established game play after game play on the gaming machine has been initiated; and the portable computing device configured to:

determine that the portable computing device does not have a configuration menu to configure the gaming machine, obtain the configuration menu from the gaming machine, determine a desired configuration for the gaming machine via the configuration menu, said configuration menu comprising a plurality of configuration parameters selectable by a user for playing a plurality of types of games on the gaming machine, determine an actual configuration of the gaming machine via the configuration menu, determine actual configuration parameters that differ from desired configuration parameters via the configuration menu, change the actual configuration parameters to the desired configuration parameters via the configuration menu, and configure the gaming machine with the desired configuration parameters via the configuration menu without interrupting established game play.

21. Computer software stored in a non-transitory machine-readable medium, the computer software including instructions to control one or more devices to perform the following steps without interrupting established game play:

after initiating the game play on the gaming machine, establishing communication between a portable computing device and the gaming machine without interrupting established game play;

determining by the portable computing device that the portable computing device does not have a configuration menu for configuring the gaming machine, said configuration menu comprising a plurality of configuration parameters selectable by a user for playing a plurality of types of games on said gaming machine;

obtaining by the portable computing device from the gaming machine the configuration menu;

displaying the configuration menu on the portable computing device;

allowing the user to indicate desired configuration data according to the configuration menu; and transmitting by the portable computer device the desired configuration data to the gaming machine such that the gaming machine is configured without interrupting established game play.

22. The computer software of claim 21, further comprising instructions to control one or more devices to retrieve the stored configuration menu from a memory of the portable computing device when it is determined that the portable computing device has a stored configuration menu for configuring the gaming machine.

23. An apparatus for configuring a gaming machine without interrupting established game play, comprising:

an interface configured to establish communication between a portable computing device and the gaming machine without interrupting established game play after game play on the gaming has been initiated; and one or more processors configured to:

determine that the portable computing device does not have a configuration menu stored thereon for configuring the gaming machine, said configuration menu comprising a plurality of configuration parameters selectable by a user for playing a plurality of types of games on said gaming machine, obtain from the gaming machine the configuration menu, display the configuration menu on the portable computing device, allow the user to indicate desired configuration data according to the configuration menu, and transmit the desired configuration data to the gaming machine such that the gaming machine is configured without interrupting established game play.

24. The apparatus of claim 23, wherein the portable computing device includes a memory configured to store the configuration menu.

25. The apparatus of claim 23, wherein the apparatus is further configured to obtaining the configuration menu from a server when it is determined that the portable computing device does not have the configuration menu stored thereon for configuring the gaming machine.

26. Software stored in a non-transitory machine-readable medium, the software comprising instructions for controlling a portable computing device to perform the following steps without interrupting established game play:

after initiating game play on a gaming machine, establishing communication between the portable computing device and the gaming machine without interrupting established game play;

receiving by the portable computing device configuration data from the gaming machine;

determining by the portable computing device, based on the received configuration data, whether a configuration of the gaming machine needs to be changed;

determining that the portable computing device does not have a configuration menu stored thereon for configuring the gaming machine, said configuration menu comprising a plurality of configuration parameters selectable by a user for playing a plurality of types of games on said gaming machine;

obtaining by the portable computing device the configuration menu from the gaming machine; and displaying the configuration menu on the portable computing device;

configuring, by the portable computing device, the gaming machine using the configuration menu and without interrupting established game play when it is determined that the configuration of the gaming machine needs to be changed.

27. The software of claim 26, wherein the determining step comprises:

making a comparison between the received configuration data and desired configuration data; and determining, based on the comparison, whether the configuration of the gaming machine needs to be changed.

28. A portable computing device, comprising:

an interface configured to establish communication between the portable computing device and a gaming machine without interrupting established game play after game play on the gaming machine has been initiated; and the portable computing device configured to:

receive configuration data from the gaming machine, determine, based on the received configuration data, that a configuration of the gaming machine needs to be changed without interrupting game play, determine that the portable computing device does not have a configuration menu stored thereon for configuring the gaming machine, said configuration menu comprising a plurality of configuration parameters selectable by a user for playing a plurality of types of games on said gaming machine, obtain the configuration menu from the gaming machine, and display the configuration menu on the portable computing device;

configure the gaming machine using the configuration menu and without interrupting established game play.

* * * * *